(No Model.) 2 Sheets—Sheet 1.

J. T. McCROSSON & W. HENDRY.
LATHE ATTACHMENT.

No. 363,475. Patented May 24, 1887.

(No Model.) 2 Sheets—Sheet 2.

J. T. McCROSSON & W. HENDRY.
LATHE ATTACHMENT.

No. 363,475. Patented May 24, 1887.

Witnesses,
Geo. H. Strong.
J. H. Nourse

Inventors,
J. T. McCrosson
Wm Hendry
By Dewey & Co.
att'ys

UNITED STATES PATENT OFFICE.

JOHN T. McCROSSON AND WILLIAM HENDRY, OF SAN FRANCISCO, CALIFORNIA.

LATHE ATTACHMENT.

SPECIFICATION forming part of Letters Patent No. 363,475, dated May 24, 1887.

Application filed January 22, 1887. Serial No. 225,184. (No model.)

*To all whom it may concern:*

Be it known that we, JOHN T. MCCROSSON and WILLIAM HENDRY, of the city and county of San Francisco, State of California, have invented an Improvement in Lathe Attachments for Vehicle-Axles; and we hereby declare the following to be a full, clear, and exact description of the same.

Our invention relates to an attachment for turning-lathes which is especially applicable for turning the tapering spindles of vehicle-axles.

It consists of a hollow or tubular sleeve extending outwardly from the face-plate or spindle of the lathe to which it is attached, and to a chuck supported at the outer end of the sleeve for holding the square portion of the axle and centering it by means of universal jaws, while the outer end of the spindle is held by the tail-stock center of the lathe. In connection with this is an adjustable guide, which is connected with the tool-rest so as to produce the desired taper to the spindle.

Figure 1:
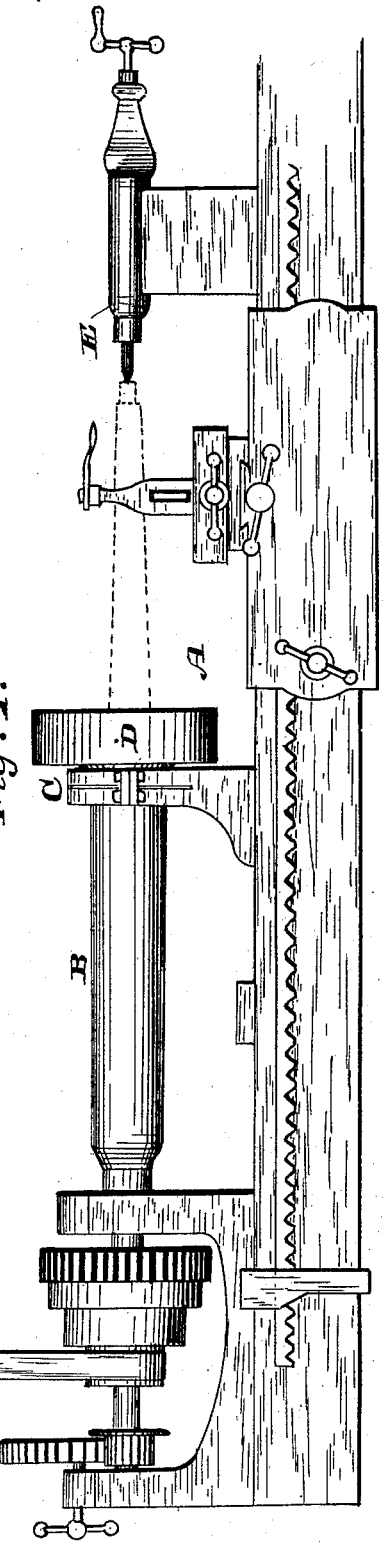
Figure 2:
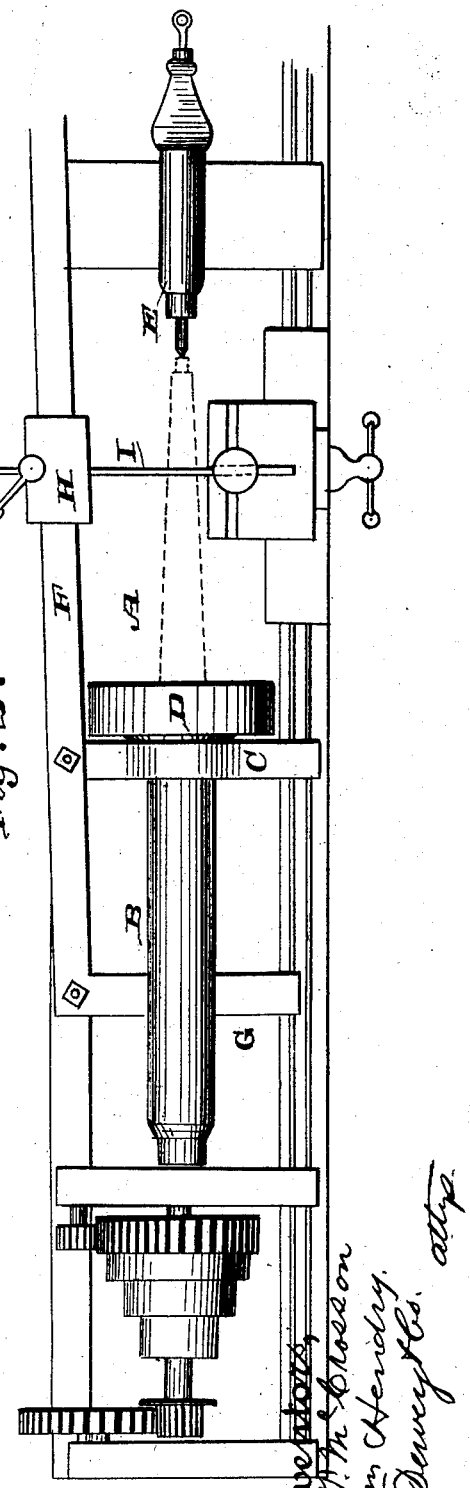
Figure 3:
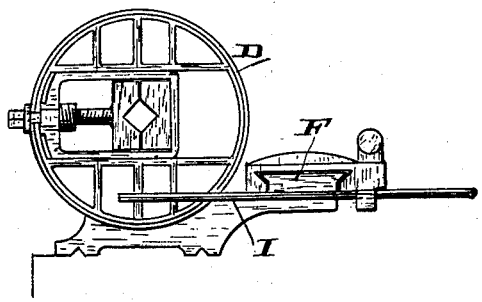

Referring to the accompanying drawings for a more complete explanation of our invention, Figure 1 is a side elevation showing the apparatus. Fig. 2 is a plan view. Fig. 3 is a front view of the chuck and an end view of the guide mounted upon the brackets, which rest on the latheways.

A is a lathe having the usual head and tail stock, tool-rest, and feed for the same. The spindle of the head-pulleys of the lathe has a screw for receiving the face-plate, and to this screw we fit the hollow sleeve B, which is of sufficient length and diameter to receive the square portion of vehicle-axles, this portion being formed with the spindle in the usual manner.

C is a rest or support, through which the outer end of the sleeve passes, and by which it is steadied, this support being fitted upon the guides or ways of the lathe.

Upon the outer end of the sleeve is fixed a chuck, D, of the pattern shown in Fig. 3, in which the jaws are moved to and from the center by means of a right-and-left-hand screw, and the opening between the jaws is adapted to seize the square portion of the axle close to the collar at the inner end of the spindle, and thus hold this portion exactly in the center. The outer end of the spindle is centered, so as to be held by the center point of the tail-stock E, and the axle is thus firmly supported at each end, so that the tool may be applied to turn it to the proper shape and size. In order to guide the tool so as to turn the axle to the proper taper, we have constructed an independent track or guide, F, which is adjustably screwed to the transverse bars G, projecting rearwardly from the bed of the lathe. This guide is attached to the bars or arms by means of bolts with locking-nuts, the guide or bars being slotted, so as to allow the guide to be adjusted to such an angle as may be desired. Upon this guide a slide, H, is fitted to travel longitudinally, and a rod, I, extends inwardly from this slide or traveler, and is connected with the tool-rest in any suitable manner, so that as the tool-rest is caused to travel by the usual feed mechanism the tool will traverse the spindle from end to end, and by means of the slide H moving upon the adjustable guide and connecting-rod I the tool will be caused to move at such an angle with the axis of the spindle that it will give it the desired taper. This construction is rendered necessary from the fact that it is impossible to move the tail-stock to one side or the other, as is done in turning ordinary taper work, the tool moving in such a case parallel with the ways of the lathe, as in this case the square axle is held centrally in the chuck, as before described, and the end passing inside the sleeve it will not be possible to move the outer center of the lathe out of a central line.

Having thus described our invention, what we claim as new, and desire to secure by Letters Patent, is—

1. The sleeve having one end attached to the spindle or face-plate of the lathe-head, a guide or support resting upon the lathe-bed, within which the outer end of the sleeve turns, and a chuck to hold the square portion of the axle, while the end of the spindle is supported by the outer lathe-center, substantially as herein described.

2. A lathe attachment for turning vehicle-axle spindles, consisting of a hollow sleeve to receive the inner end of the axle, said sleeve projecting from the lathe-head by which it is driven, and having a chuck upon its outer end to hold the square portion of the axle near the shoulder, while the end of the spindle is supported by the tail-center of the lathe, in combination with the adjustable guide at the back of the lathe and the slide or traveler moving upon said guide, having the rod connecting it with the tool-rest, substantially as herein described.

In witness whereof we have hereunto set our hands.

JOHN T. McCROSSON.
WILLIAM HENDRY.

Witnesses:
GEO. H. STRONG,
S. H. NOURSE.